United States Patent [19]

Eisenman

[11] 4,055,265
[45] Oct. 25, 1977

[54] BULK BED

[76] Inventor: Leonard J. Eisenman, Box A, Eisenman Road, Boise, Idaho 83706

[21] Appl. No.: 722,040

[22] Filed: Sept. 10, 1976

[51] Int. Cl.$^2$ .......................... B60P 1/38; B65G 17/12
[52] U.S. Cl. .................................. 214/17 D; 198/844; 214/83.36
[58] Field of Search ................. 214/17 D, 83.18, 83.2, 214/83.36; 198/802, 844, 847

[56] References Cited

U.S. PATENT DOCUMENTS

| 749,695 | 1/1904 | Litchfield et al. | 198/836 |
| 2,496,463 | 2/1950 | Gaddis | 214/83.36 |
| 2,717,703 | 9/1955 | Kull et al. | 214/83.36 X |

Primary Examiner—Robert G. Sheridan
Attorney, Agent, or Firm—Wells, St. John & Roberts

[57] ABSTRACT

A bulk bed for receiving and discharging bulk quantities of articles such as sugar beets, potatoes, grain, and other material that may be stored in bulk condition. The bulk bed includes an upwardly open bin having downwardly converging side walls. An endless conveyor belt extends along a bottom wall of the bin. It is utilized to urge the material toward a discharge end of the bin. Material exits through a door at one end of the bin. The conveyor belt is made up of a multiplicity of overlapped sections of belting material that are rigidly connected at their leading edges to an endless chain. The chain is in meshing engagement with sprockets at opposite ends of the bin. The belting sections include trailing edges that are not fixed to the chains and are thus able to drop clear of the chain as it moves around the conveyor discharge end. This feature serves to clear dirt and other material from the area beneath the belt working flight and to prevent binding of the chain links. The trailing edges of the belt sections overlap the adjacent leading edges of successive belt sections in order to form a continuous flat surface across the full length of the bed. One of two doors may be opened at the rearward end of the bed to enable discharge of material in response to movement of the conveyor working flight toward the discharge end. Thus, bulk material may be quickly and efficiently discharge from the bin.

4 Claims, 7 Drawing Figures

BULK BED

BACKGROUND OF THE INVENTION

The present invention relates to bulk bed material carriers and particularly to such bulk beds utilizing an integral conveyor to assist in unloading material from the bulk bed.

There has been difficulty particularly in the farming industry to provide some form of bulk bed for receiving and efficiently discharging material in bulk quantity. Different crops have varying susceptibility to damage during handling. For example, potatoes must be handled very carefully to avoid bruising where other bulk materials such as sugar beets may be handled rather roughly since bruising does not affect the market for the crop. It is therefore desirable to obtain some form of material carrying and handling apparatus that will function to handle either crop as efficiently as possible. It is further desirable to obtain some form of bulk material holding and discharge apparatus that may be utilized for a variety of bulk materials other than farm produce.

Bulk beds have been designed to be attached to trucks in order to provide mobile support for bulk material. Such beds often include a horizontal conveyor that drags transverse bars along the length of the bed toward a discharge door. The material is engaged by the bars and forcibly moved toward the discharge end of the bulk bed. The problem arising with such cross members is that they become easily bound by dirt or rock particles that wedge between the bars and bulk bed, or that bind in the links of the chain attached to the transverse bars. Further, root crops such as potatoes are easily bruised when they are forced to slide across the bin floor.

Belt conveyors have a distinct advantage when being utilized to move material toward a discharge end of a bulk bed carrier. The conveyor belt will not drag the material along the bulk bed floor but, instead, acts as a support surface for the material and therefore prevents bruising while the material is delivered to the discharge end of the bed. However, there is considerable difficulty in providing a continuous belt conveyor that will move effectively under the relatively heavy loads provided by the bulk material carried thereon. The reason for this is that the end rolls that are normally used to drive the belt conveyor will slip against the underside of the belt since the roll and the belt surface are not positively engaged. This problem has been alleviated by producing bulk beds that include a false floor upwardly adjacent the working flight of the belt conveyor. This floor is selectively removable in sections when it is desired to remove the material of the bed to a different location. Sections of the false floor are removed to allow the material to drop onto the conveyor belt and be moved to the discharge end. However, it is very difficult to remove the false floor sections under the tremendous weight of the material within the bin.

U.S. Pat. No. 861,484 to Stewart granted July 30, 1907 discloses an endless carrier comprised of a chain having a number of plates carried thereon. The plates are mounted at forward or leading edges to the chain, with the trailing edges freely pivoted. The trailing edges overlap the leading edges of adjacent plates to form a substantially planar carrying belt or apron. The plates will drop to a vertical position on the lower or return run of the chain to prevent material from gathering on the inside of the conveyor belt surfaces. The chain is comprised of a series of interconnected links made from a single piece of wire or rod bent into a rectangular form. The forms are joined by integral eyelets at forward and rearward corners of the forms. The plates are fastened to transverse sections of the rod. Rollers or pulleys are utilized in place of sprockets to carry the chain and plates to define the conveyor working and return flights. The flaps are disclosed as being flexible or inflexible.

U.S. Pat. No. 1,322,032 to E. C. Litchfield et al granted Nov. 18, 1919, discloses a manure spreader. This spreader includes a hopper with walls converging downwardly toward the working flight of a conveyor that is comprised of a multiplicity of overlapped plates carried on an endless chain. The chain is driven by sprockets located at opposite longitudinal ends of the bin. One end of the bin includes a flexible covering that slides over the overlapped plates and allows discharge of manure therethrough.

Other patents of interest are U.S. Pat. Nos. 3,447,668; 3,901,377; 1,024,073; 1,388,407; and 3,265,188.

SUMMARY OF THE INVENTION

A bulk bed is described that comprises an elongated bin with longitudinal sides converging downwardly to a horizontal floor that is joined by upright front and rear end walls. An endless chain conveyor is included that provides a working flight extending along the full length of the bin downwardly adjacent the converging sides thererof. A plurality of flexible conveyor belt sections, each having a leading edge pivotally connected to the chain conveyor and a trailing edge overlapping the leading edge of the next successive belting section, are located about the periphery of the endless chain. Transverse support bars are mounted to the chain conveyor at spaced locations along the length of the conveyor chain to provide support to the overlapping conveyor belt sections. Drive means operate the endless chain conveyor to move the working flight thereof in a rearward direction from a front end wall of the bin to the rearward end wall. The drive means is operatively connected to a drive sprocket means that is rotatably mounted near the rear end wall of the bin adjacent the access means. The drive sprocket means is in meshing engagement with the chain conveyor means. Similarly, an idler sprocket means is rotatably mounted near the forward end of the bin adjacent the front end wall and meshes with the chain conveyor to define the forward end of the conveyor working flight. The working flight is slidably supported by the bin floor.

It is a first object of the present invention to provide a bulk bed that will receive and efficiently function in conjunction with a variety of bulk material such that the material may be quickly and efficiently discharged therefrom with minimum damage to the material as it is handled.

Another important object is to provide such a bulk bin wherein a discharge conveyor is provided that presents a substantially continuous flexible support surface to the bulk material but that is driven through meshing engagement of chain and sprockets such that positive transfer of motion may be obtained between the driving mechanism and the conveyor assembly.

A still further object is to provide such a bin with a conveying assembly that is substantially self-cleaning and is therefore adapted for use with a wide variety of material.

A still further object is to provide such a bulk bed that includes access means adaptable to facilitate efficient discharge of relatively fragile material at an optimum rate, or fast discharge of material that is not easily damaged.

These and still further objects and advantages will become apparent upon reading the following description which, taken with the accompanying drawings, disclose a preferred form of the present invention. It should be noted that the following description is only given by way of example and that various other forms thereof may come to mind upon reviewing the disclosure. Therefore, the scope of what I define as my invention is set forth only by the claims found at the end of this specification.

DETAILED DESCRIPTION OF A PREFERRED EMBODIMENT

Figure 1:
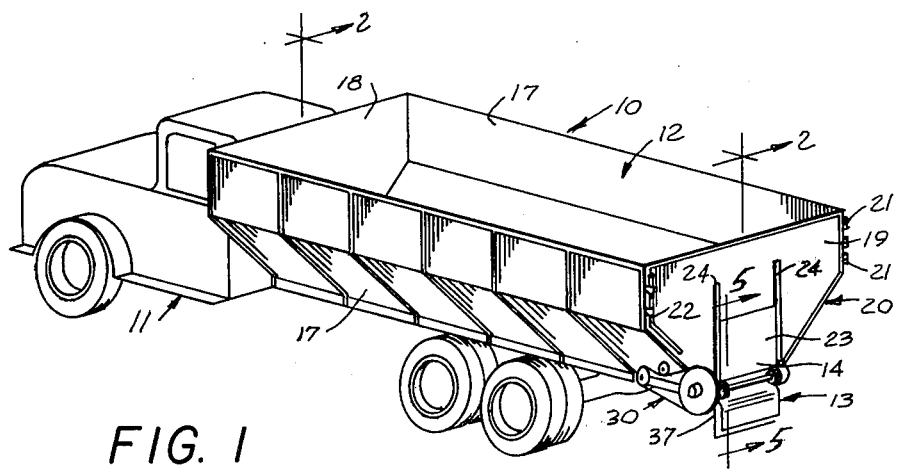
FIG. 1 is a pictorial view of the bulk bed mounted to a truck.

A preferred form of the present bulk bed is illustrated in the accompanying drawings and is generally designated therein by the reference character 10. It is intended that the bulk bed 10 be adapted for mounting to the frame of a truck 11 or similar transport vehicle. The bulk bed 10 is utilized to receive bulk material such as grain, potatoes, fertilizer, etc. in bulk quantity for transport. The bed 10 is also designed with a conveyor means 13 for quickly and efficiently emptying the bed at a discharge 14.

The bulk bed 10 is basically comprised of an elongated bin 12 that is formed by a longitudinal floor 16 joining the lower edges of downwardly converging side walls 17. Walls 17 are joined at front edges by a front end wall 18 and at rear edges by a rear wall 19.

Figure 5:
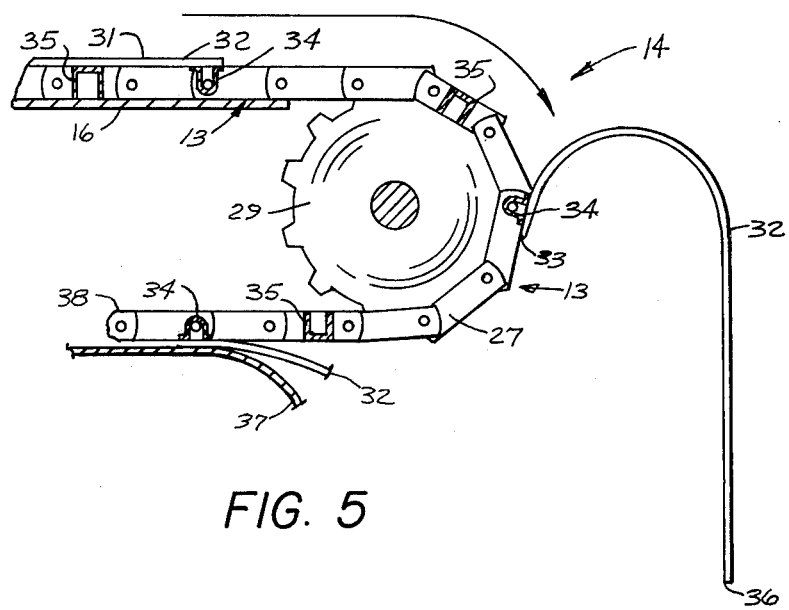
FIG. 5 is a fragmentary view illustrating operation of the present belt section assemblies.
Figure 6:
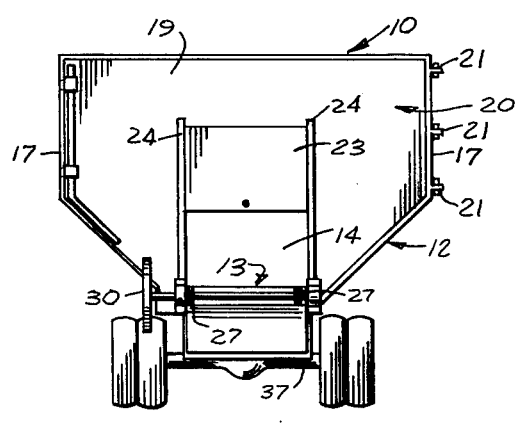
FIG. 6 is a rear view of the assembly as seen from the right in FIG. 1.

The rear wall 19 is an integral portion of an access means 20 that is utilized in discharging material from the bin 12. Wall 19 is mounted by hinges 21 to one of the side walls 17 for pivotal movement about a vertical axis to a position clear of the walls 17 and floor 16 (FIG. 6). When the wall 19 is moved to a closed condition as shown in FIGS. 1, 2, and 5, it completes the bin closure to permit transport of material held therein.

Figure 2:
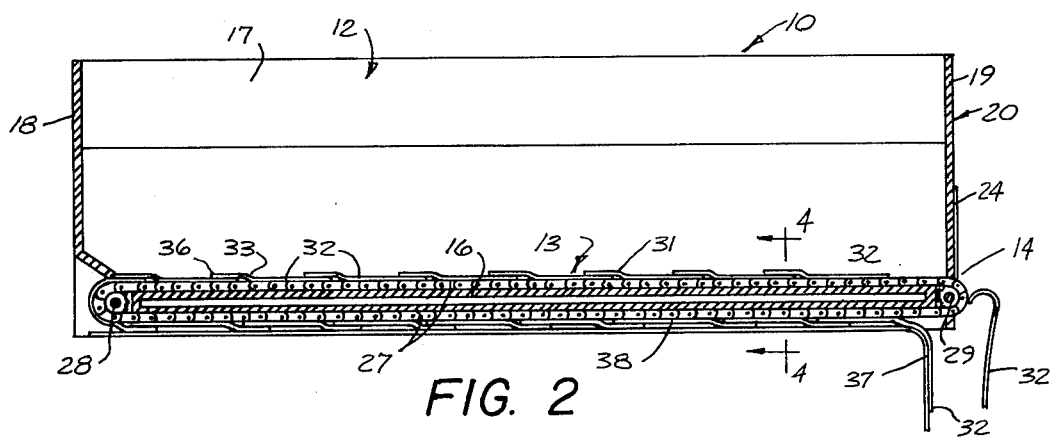
FIG. 2 is a longitudinal section view taken along line 2—2 in FIG. 1.
Figure 3:
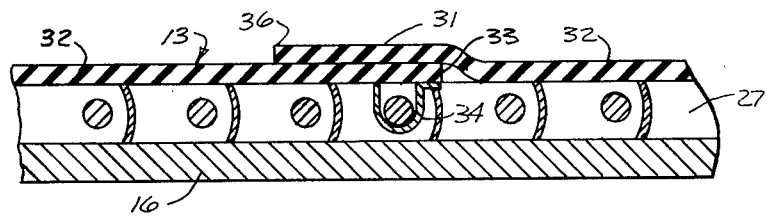
FIG. 3 is an enlarged fragmentary sectional view of a portion of the present invention.
Figure 4:
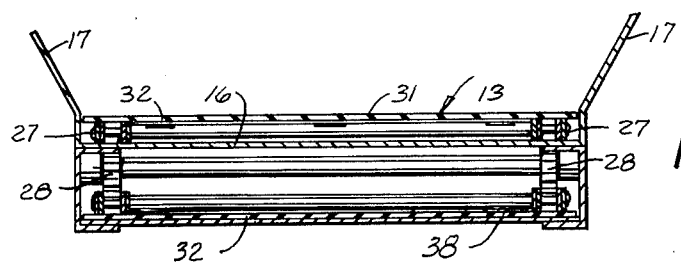
FIG. 4 is an enlarged sectional view taken from along line 4—4 in FIG. 2.

The rear wall 19 may be selectively locked in the closed position by means of a manually operable latch 22 (FIG. 1). Another door 23 is formed through the rear wall 19 directly adjacent the discharge 14 of the conveyor means 13. This door 23 is mounted by slides 24 to move vertically over the wall 19. Door 23 is shown closed in FIGS. 1 and 2 and open in FIG. 5. The purpose of door 23 is to enable selective discharge of fragile material such as potatoes.

A very important feature of the present invention is provision of the conveyor means 13 and its specific design considerations. Referring to FIGS. 2 through 5 of the drawings, it may be seen that conveyor means 13 is basically comprised of a transversely spaced pair of endless chains 27. Each chain 27 extends about an idler sprocket 28 at the forward end of bin 12 and a drive sprocket 29 at the discharge 14. A drive means 30 is connected to the sprockets 29 in order to operate the conveying means to move a working flight 31 continuously from the forward bin end toward the discharge 14.

The endless chains 27 are slidably supported on the horizontal floor 16 and move along the floor adjacent the converging side walls 17. The portions of the endless chains 27 that are supported on floor 16 comprise a working flight 31 of the conveying means 13.

The endless chains 27 are connected to one another by a plurality of flexible belt sections 32. Each belt section 32 is rectangular and includes a leading edge 33 that is fixed to a transverse belt mounting bar 34. The bars 34 are pivotally mounted to opposed link pins of chains 27. The bars 34 extend transverse to the chain lengths across the floor 16. The forward or leading edge 33 of each flexible belt section 32 is fastened to a mounting bar 34 by means of rivets (not shown).

Each flexible belt section 32 further includes a trailing edge 36 that is not connected in any manner to the endless chain 27. Each trailing edge 36 overlaps a leading edge 33 of the next successive belt section 32. The result is a formation as shown in FIG. 2 along the working flight 31 of a relatively continuous surface along the full length of bin 12.

The flexible belt sections 32 are constructed of ordinary flexible rubber impregnated fiber conveyor belting material. They will therefore conform at least partially to the material being handled and will not damage the material while it is being delivered from the bin past the discharge 14. Additional support is provided to the individual belt sections 32 by a number of intermediate support bars 35 (FIG. 5). Bars 35 extend between chains 27 similarly to the mounting bars 34. They are located intermediate adjacent bars 34 to provide support to the flexible surfaces of belt sections 32 as they move along the working flight 31.

When the conveyor means 13 is being utilized to unload material from bin 12, it is expected that some loose material or dirt may work its way between the belt side edges and walls 17, coming to rest against the floor 16. Ordinarily, this dirt will build up between the working flight 31 and the floor surface until the chain links become clogged. With the present invention, facilities are provided for cleaning this area continuously as the conveyor means is in operation. This action is shown in particular by FIGS. 2 and 5.

The self-cleaning function of the present conveyor means 13 is facilitated through the flexible belt sections 32 at the discharge end 14. As may be noted in FIGS. 2 and 5, the individual sections will swing downwardly to a substantially vertical condition as the chains 27 move around the drive sprockets 29. This opens the area beneath the belt sections and allows dirt or other material within that area to fall freely to the ground below. The cross bars 34 assist in moving loose dirt and other material toward the conveyor discharge and therefore prevent buildup of the material between the working flight 31 and bin floor 16. A downwardly bent plate 37 is mounted to the truck frame with a horizontal portion thereof extending along the return flight 38 of conveyor means 13. Plate 37 gradually swings the downwardly hanging flaps upwardly to the overlapping condition and holds the flaps in this condition as they move back toward the idler sprockets 28. This plate is not entirely essential but is desirable in some instances to protect the belt sections 32 by holding them above moving parts of the truck undercarriage.

The access means 20 is held in a closed condition as shown in FIG. 1 while the bin 12 is filled with bulk material. Loading of the bin may be accomplished in the field, for example when potatoes are being harvested. In this instance the potatoes may be directly loaded into the bin 12 from the harvesting implement. When the bin is full, the material is taken to a central location and unloaded.

Figure 7:
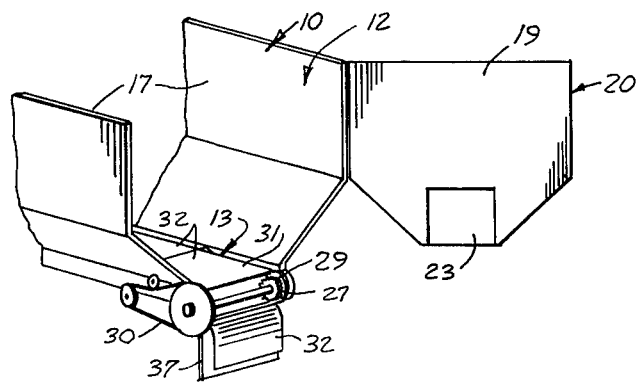
FIG. 7 is a fragmentary pictorial view of the rearward portion of the present bulk bed.

During the unloading operation, the access means 20 is moved to an open condition either as shown in FIGS. 6 or 7. If potatoes are being handled, only the smaller door 23 is opened since potatoes must be handled carefully to prevent bruising. As the door 23 is opened, the drive means 30 is actuated to start the conveyor means operating beneath the load of material. The direct mechanical connection between the chains 27 and belt sections 32 enable direct transfer of power from the drive means 30 to conveyor means 20. Thus, the entire load is gradually shifted toward the discharge 14 through the open door.

Individual belt sections 32 moving around the drive sprockets 29 will flip downwardly and hand loosely for a short time as shown in FIGS. 2 and 5. This opens the area between the lower surfaces of the successive belt sections 32 and the area below and adjacent to the conveyor chains 27. Material between the belt and floor section 16 may therefore be dropped from the discharge to avoid binding of the chain and to prevent excessive chain wear.

It may have become obvious from the above description and attached drawings that various changes and modifications may be made therein without departing from the scope of this invention. Therefore, only the following claims are to be taken as limitations on the scope of my invention.

What I claim is:

1. A bulk bed for receiving and discharging loads of bulk agricultural products, comprising:

a central elongated floor having a horizontal upper surface bounded by parallel side edges;

a pair of longitudinal side walls converging downwardly and inwardly to the respective side edges of the floor;

upright front and rear end walls joined to the side walls at the respective opposite ends thereof;

said floor, side walls and front and rear end walls presenting an upwardly open bin for the storage or transport of bulk agricultural products;

access means formed at the rear end wall and leading upward from the floor for selectively opening the interior of the bin at the rear end thereof for discharging bulk agricultural products therefrom;

drive sprocket means rotatably mounted to said bin about a transverse horizontal axis adjacent the rear end wall;

idler sprocket means rotatably mounted to said bin about a transverse horizontal axis adjacent the front end wall;

endless chain conveyor means entrained in meshing engagement about said drive sprocket means and said idler sprocket means, thereby forming coplanar working flights slidably supported along the full length of the floor adjacent the side edges thereof and parallel return flights beneath said floor, the working flights leading from a forward end at said idler sprocket means to a rear discharge end at said drive sprocket means;

power means operatively connected to said drive sprocket means for moving said endless chain conveyor means in a direction such that the working flights move rearwardly along the floor;

a plurality of flexible conveyor belt sections fixed to said endless chain conveyor means and covering the working flights thereof, each belt section along the working flights having a leading edge facing toward the rear end wall and fastened to said chain conveyor means and a free trailing edge facing toward the front end wall and loosely lapped over the leading edge of a successive belt section located adjacent to it along the working flight of said endless chain conveyor means;

transverse support bars mounted to said endless chain conveyor means at longitudinally spaced locations thereon for supporting the overlapped belt sections as they move along the working flight; and supporting plate means fixed below and parallel to the floor, said plate means extending substantially the full length of the floor and having an upper surface leading to a downwardly bent rear section positioned forwardly adjacent to the rear discharge end of the conveyor working flight, said supporting plate means being adapted to be slidably engaged by successive belt sections on the endless chain conveyor means after movement over said drive sprocket means for shifting the belt sections to an overlapped condition and supporting them in such condition as they move along the return flights of said chain conveyor means to said idler sprocket means.

2. The bulk bed as recited by claim 1 wherein the rear end wall is pivotably hinged to one side wall to form a portion of said access means and wherein the access means further includes a door formed in the rear end wall adjacent the rearward end of the conveyor working flight.

3. The bulk bed as recited by claim 1 further comprising transverse belt section mounting bars fixed to the chain conveyor at longitudinal spaces thereon for receiving and fixedly mounting the leading edges of the belt sections.

4. The bulk bed as recited by claim 3 wherein the chain conveyor means is comprised of two laterally spaced endless chains interconnected for simultaneous movement by the transverse support bars and belt section mounting bars and wherein the drive and idler sprocket means includes rotatable sprockets in meshing engagement with the endless chains.

* * * * *